United States Patent
Li et al.

(10) Patent No.: US 10,536,321 B2
(45) Date of Patent: Jan. 14, 2020

(54) MESSAGE ATTACK DEFENSE METHOD AND APPARATUS

(71) Applicant: Huawei Technologies Co., Ltd., Shenzhen (CN)

(72) Inventors: Jinming Li, Beijing (CN); Chengchen Hu, Xi'an (CN); Huanzhao Wang, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 242 days.

(21) Appl. No.: 15/674,969

(22) Filed: Aug. 11, 2017

(65) Prior Publication Data

US 2017/0338998 A1    Nov. 23, 2017

Related U.S. Application Data

(63) Continuation of application No. PCT/CN2015/084694, filed on Jul. 21, 2015.

(30) Foreign Application Priority Data

Feb. 13, 2015 (CN) .......................... 2015 1 0080973

(51) Int. Cl.
  *H04L 29/06*    (2006.01)
  *H04L 12/54*    (2013.01)
  *H04W 24/10*    (2009.01)
  *G06F 9/48*     (2006.01)
  *H04L 12/70*    (2013.01)

(52) U.S. Cl.
  CPC ...... *H04L 29/06911* (2013.01); *G06F 9/4881* (2013.01); *H04L 12/56* (2013.01); *H04W 24/10* (2013.01); *H04L 2012/5682* (2013.01)

(58) Field of Classification Search
  CPC ... H04L 29/06911; H04L 12/56; H04L 29/06; H04L 63/1458; H04L 2012/5682; G06F 9/4881; H04W 24/10
  See application file for complete search history.

(56) References Cited

U.S. PATENT DOCUMENTS

| | | | | |
|---|---|---|---|---|
| 2006/0221978 A1* | 10/2006 | Venkatachalam | ..... | H04L 47/524 370/395.41 |
| 2011/0149977 A1* | 6/2011 | Thomas | ................ | H04L 47/524 370/395.41 |
| 2013/0097608 A1* | 4/2013 | Kessler | ................ | G06F 9/4881 718/104 |
| 2014/0146831 A1* | 5/2014 | Xu | .......................... | H04L 47/62 370/412 |

(Continued)

FOREIGN PATENT DOCUMENTS

| CN | 102326369 A | 1/2012 |
|---|---|---|
| CN | 103346922 A | 10/2013 |

(Continued)

*Primary Examiner* — Yonas A Bayou
(74) *Attorney, Agent, or Firm* — Slater Matsil, LLP (57) ABSTRACT

The present disclosure discloses a message attack defense method and apparatus. The method includes: receiving, by a controller, a report message sent by at least one switch; respectively storing, by the controller in a switch queue corresponding to each switch, the received report message that is sent by each switch; and performing, by the controller, round-robin scheduling on the switch queue corresponding to each switch.

16 Claims, 5 Drawing Sheets

(56) References Cited

U.S. PATENT DOCUMENTS

| | | | | |
|---|---|---|---|---|
| 2015/0236968 A1* | 8/2015 | Zhang | ................ | H04L 63/1416 |
| | | | | 370/230 |
| 2015/0263960 A1* | 9/2015 | Kasturi | .................. | H04L 47/22 |
| | | | | 370/230.1 |
| 2015/0326660 A1* | 11/2015 | Satterlee | ................ | H04L 67/14 |
| | | | | 709/203 |
| 2015/0334595 A1* | 11/2015 | Bosch | .................... | H04L 29/06 |
| | | | | 370/235 |
| 2015/0365290 A1* | 12/2015 | Yakuwa | ................ | H04L 12/56 |
| | | | | 370/250 |
| 2016/0094491 A1* | 3/2016 | Fedorov | ................ | H04L 51/02 |
| | | | | 709/206 |
| 2016/0099964 A1* | 4/2016 | Htay | .................. | H04L 63/1425 |
| | | | | 726/23 |
| 2017/0324781 A1* | 11/2017 | Hu | ...................... | H04L 63/0227 |
| 2017/0374028 A1* | 12/2017 | Oliver | ................ | H04L 63/0227 |

FOREIGN PATENT DOCUMENTS

| | | | |
|---|---|---|---|
| CN | 103677760 A | | 3/2014 |
| CN | 103747026 A | * | 4/2014 |
| CN | 103747026 A | | 4/2014 |
| WO | 2011053784 A1 | | 5/2011 |
| WO | 2014139558 A1 | | 9/2014 |

* cited by examiner

MESSAGE ATTACK DEFENSE METHOD AND APPARATUS

CROSS-REFERENCE TO RELATED APPLICATIONS

This application is a continuation of International Application No. PCT/CN2015/084694, filed on Jul. 21, 2015, which claims priority to Chinese Patent Application No. 201510080973.5, filed on Feb. 13, 2015. The disclosures of the aforementioned applications are hereby incorporated by reference in their entireties.

TECHNICAL FIELD

The present disclosure relates to the field of communications technologies, and in particular, to a message attack defense method and apparatus.

BACKGROUND

Software defined networking (SDN) is a network architecture in which a control function is separated from a forwarding function. The SDN is divided into a control plane and a data plane. The control plane is responsible for control and management of the entire network, and data is forwarded on the data plane according to a rule specified by the control plane. A control device on the control plane is referred to as a central controller (controller for short), and a forwarding device on the data plane is a network switch (switch for short). As a core device of the entire SDN, the controller determines correct forwarding of traffic on the data plane. The switch processes a data packet according to a flow table sent by the controller, for example, performs an operation of forwarding or discarding the data packet.

An attacked object in conventional cyber security generally is a host or a server. In the SDN, the controller as the core device of the entire SDN also has a possibility of being attacked. A form of an attack on the controller generally is a packet_in message flooding attack, where packet_in is a message type.

In the SDN, when receiving a data packet, the switch first performs matching between the data packet and flow entries in an internal flow table of the switch, and if the matching succeeds, performs an operation indicated by a flow entry that succeeds in the matching. If a flow entry that matches the data packet does not exist in the internal flow table, the switch constructs a packet_in message, and sends the packet_in message to the controller, to request the controller to deliver a rule for processing the data packet.

After receiving the packet_in message, the controller sends a flow entry to the switch through determining. The flow entry includes the rule for processing the data packet. Therefore, an important function of the controller is to effectively process the packet_in message.

Therefore, when attacking a controller, a malicious attacker in a network usually constructs lots of meaningless, illegal, or random data packets. Consequently, a switch cannot perform matching between the data packets and flow entries in an internal flow table, and then, the switch may construct lots of packet_in messages, and send the packet_in messages to the controller. The packet_in messages occupy both resources of the controller and effective bandwidth of a secure channel between the controller and the switch. Consequently, a time of the controller for processing other unattacking data is prolonged, and even a service request of a normal user cannot be responded to.

SUMMARY

Embodiments of the present disclosure provide a message attack defense method and apparatus, so as to ensure a normal response to a service request of a normal user during message attack defense.

According to a first aspect, an embodiment of the present disclosure provides a message attack defense method. The method includes receiving, by a controller, a report message sent by at least one switch. The method also includes respectively storing, by the controller in a switch queue corresponding to each switch, the received report message that is sent by each switch. The method also includes performing, by the controller, round-robin scheduling on the switch queue corresponding to each switch.

With reference to the first aspect, in a first possible implementation of the first aspect, the respectively storing, by the controller in a switch queue corresponding to each switch, the received report message that is sent by each switch specifically includes: determining, by the controller, a switch queue to which the report message belongs; determining, by the controller, whether a host queue corresponding to the switch queue to which the report message belongs exists, where the host queues is host queues corresponding to hosts connected to a switch corresponding to the switch queue to which the report message belongs; and when determining that the host queue corresponding to the switch queue to which the report message belongs does not exist, and determining that a quantity of report messages that are already stored in the switch queue to which the report message belongs is greater than a first threshold, establishing, by the controller, a host queue corresponding to the switch queue to which the report message belongs, and inserting the report message into the host queue corresponding to the switch queue to which the report message belongs; and during the performing, by the controller, round-robin scheduling on the switch queue corresponding to each switch, if it is determined that a currently scheduled switch queue is empty, the method further includes: determining, by the controller according to quantities of report messages that are already stored in host queues corresponding to the currently scheduled switch queue and a second threshold, priorities of the host queues corresponding to the currently scheduled switch queue; and performing, by the controller, round-robin scheduling on the host queues according to the priorities of the host queues corresponding to the currently scheduled switch queue.

With reference to the first possible implementation of the first aspect, in a second possible implementation of the first aspect, during the performing, by the controller, round-robin scheduling on the host queues according to the priorities of the host queues corresponding to the currently scheduled switch queue, the method further includes: when determining that the quantities of report messages that are already stored in the host queues corresponding to the currently scheduled switch queue are all less than a third threshold, if the controller receives a report message sent by a switch corresponding to the currently scheduled switch queue, inserting, by the controller into the currently scheduled switch queue, the received report message that is sent by the switch corresponding to the currently scheduled switch queue, where the third threshold is less than the second threshold.

With reference to the second possible implementation of the first aspect, in a third possible implementation of the first aspect, after the inserting, by the controller into the currently scheduled switch queue, the received report message that is sent by the switch corresponding to the currently scheduled switch queue, the method further includes: when determining that a host queue without a report message exists in the host queues corresponding to the currently scheduled switch queue, deleting the host queue without a report message; or when determining that no report messages are stored in all the host queues corresponding to the currently scheduled switch queue, deleting the host queues corresponding to the currently scheduled switch queue.

With reference to any one of the first to the third possible implementations of the first aspect, in a fourth possible implementation of the first aspect, after the determining, by the controller, whether a host queue corresponding to the switch queue to which the report message belongs exists, the method further includes: when determining that the host queue corresponding to the switch queue to which the report message belongs does not exist, and determining that the quantity of report messages that are already stored in the switch queue to which the report message belongs is less than the first threshold, inserting, by the controller, the report message into the switch queue to which the report message belongs.

With reference to any one of the first to the fourth possible implementations of the first aspect, in a fifth possible implementation of the first aspect, after the determining, by the controller, whether a host queue corresponding to the switch queue exists, the method further includes: when determining that the host queue corresponding to the switch queue to which the report message belongs exists, and determining that a quantity of report messages that are already stored in any host queue is greater than a fourth threshold and the quantity of report messages that are already stored in the switch queue to which the report message belongs is less than the first threshold, inserting, by the controller, the report message into the host queue corresponding to the switch queue to which the report message belongs, where the fourth threshold is less than the second threshold.

With reference to any one of the first to the fifth possible implementations of the first aspect, in a sixth possible implementation of the first aspect, after the determining, by the controller, whether a host queue corresponding to the switch queue to which the report message belongs exists, the method further includes: when determining that the host queue corresponding to the switch queue to which the report message belongs exists, and determining that a quantity of report messages that are already stored in each host queue is less than a fifth threshold and the quantity of report messages that are already stored in the switch queue to which the report message belongs is less than the first threshold, inserting, by the controller, the report message into the switch queue to which the report message belongs, where the fifth threshold is less than the second threshold.

With reference to any one of the first aspect or the first to the sixth possible implementations of the first aspect, in a seventh possible implementation of the first aspect, the performing, by the controller, round-robin scheduling on the switch queue corresponding to each switch specifically includes: performing, by the controller, round-robin scheduling on the switch queue corresponding to each switch according to a report message weight that is pre-allocated to each switch.

According to a second aspect, an embodiment of the present disclosure provides a message attack defense apparatus. The apparatus includes a receiving module, configured to receive a report message sent by at least one switch. The apparatus also includes a storage module, configured to respectively store, in a switch queue corresponding to each switch, the report message that is sent by each switch and that is received by the receiving module. The apparatus also includes a scheduling module, configured to perform round-robin scheduling on the switch queue that is stored by the storage module and that corresponds to each switch.

With reference to the second aspect, in a first possible implementation of the second aspect, the apparatus further includes: a determining module, configured to determine a switch queue to which the report message belongs; a judging module, configured to determine whether a host queue corresponding to the switch queue to which the report message belongs exists, where the host queues is host queues corresponding to hosts connected to a switch corresponding to the switch queue to which the report message belongs; a first determining module, configured to determine that a quantity of report messages that are already stored in the switch queue to which the report message belongs is greater than a first threshold; an establishment module, configured to: when the judging module determines that the host queue corresponding to the switch queue to which the report message belongs does not exist, and the first determining module determines that the quantity of report messages that are already stored in the switch queue to which the report message belongs is greater than the first threshold, establish a host queue corresponding to the switch queue to which the report message belongs, where the storage module is specifically configured to insert the report message into the host queue that is established by the establishment module and that corresponds to the switch queue to which the report message belongs; and a second determining module, configured to: when the scheduling module performs round-robin scheduling on the switch queue corresponding to each switch, if it is determined that a currently scheduled switch queue is empty, determine priorities of host queues according to quantities of report messages that are already stored in the host queues corresponding to the currently scheduled switch queue and a second threshold, where the scheduling module is specifically configured to perform round-robin scheduling on the host queues according to the priorities that are of the host queues corresponding to the currently scheduled switch queue and that are determined by the second determining module.

With reference to the first possible implementation of the second aspect, in a second possible implementation of the second aspect, the apparatus further includes a third determining module, where the third determining module is configured to: when the scheduling module performs round-robin scheduling on the host queues according to the priorities of the host queues corresponding to the currently scheduled switch queue, determine whether the quantities of report messages that are already stored in the host queues corresponding to the currently scheduled switch queue are all less than a third threshold; and the storage module is configured to: when the third determining module determines whether the quantities of report messages that are already stored in the host queues corresponding to the currently scheduled switch queue are all less than the third threshold, if the receiving module receives a report message sent by a switch corresponding to the currently scheduled switch queue, insert, into the currently scheduled switch queue, the report message that is sent by the switch corresponding to the currently scheduled switch queue and that is received by the receiving module, where the third threshold is less than the second threshold.

With reference to the second possible implementation of the second aspect, in a third possible implementation of the second aspect, the apparatus further includes: a fourth determining module, configured to: after the storage module inserts, into the currently scheduled switch queue, the report message that is sent by the switch corresponding to the currently scheduled switch queue and that is received by the receiving module, determine whether a host queue without a report message exists in the host queues corresponding to the currently scheduled switch queue; and a deletion module, configured to: when the fourth determining module determines that the host queue without a report message exists in the host queues corresponding to the currently scheduled switch queue, delete the host queue without a report message; or a fourth determining module, configured to: after the storage module inserts, into the currently scheduled switch queue, the report message that is sent by the switch corresponding to the currently scheduled switch queue and that is received by the receiving module, determine whether no report messages are stored in all the host queues corresponding to the currently scheduled switch queue; and a deletion module, configured to: when the fourth determining module determines that no report messages are stored in all the host queues corresponding to the currently scheduled switch queue, delete the host queues corresponding to the currently scheduled switch queue.

With reference to any one of the first to the third possible implementations of the second aspect, in a fourth possible implementation of the second aspect, the first determining module is further configured to determine that the quantity of report messages that are already stored in the switch queue to which the report message belongs is less than the first threshold; and the storage module is further configured to: when the judging module determines that the host queue corresponding to the switch queue to which the report message belongs does not exist, and the first determining module determines that the quantity of report messages that are already stored in the switch queue to which the report message belongs is less than the first threshold, insert the report message into the switch queue to which the report message belongs.

With reference to any one of the first to the fourth possible implementation of the second aspect, in a fifth possible implementation of the second aspect, the apparatus further includes: a fifth determining module, configured to: when the judging module determines that the host queue corresponding to the switch queue to which the report message belongs exists, determine that a quantity of report messages that are already stored in any host queue is greater than a fourth threshold and the quantity of report messages that are already stored in the switch queue to which the report message belongs is less than the first threshold, where the storage module is further configured to: when the judging module determines that host queue corresponding to the switch queue to which the report message belongs exists, and the fifth determining module determines that the quantity of report messages that are already stored in any host queue is greater than the fourth threshold and the quantity of report messages that are already stored in the switch queue to which the report message belongs is less than the first threshold, insert the report message into the host queue corresponding to the switch queue to which the report message belongs, where the fourth threshold is less than the second threshold.

With reference to any one of the first to the fifth possible implementations of the second aspect, in a sixth possible implementation of the second aspect, the apparatus further includes: a sixth determining module, configured to: when the judging module determines that the host queue corresponding to the switch queue to which the report message belongs exists, determine that a quantity of report messages that are already stored in each host queue is less than a fifth threshold and the quantity of report messages that are already stored in the switch queue to which the report message belongs is less than the first threshold, where the storage module is further configured to: when the judging module determines that host queue corresponding to the switch queue to which the report message belongs exists, and the sixth determining module determines that the quantity of report messages that are already stored in each host queue is less than the fifth threshold and the quantity of report messages that are already stored in the switch queue to which the report message belongs is less than the first threshold, insert the report message into the switch queue to which the report message belongs, where the fifth threshold is less than the second threshold.

With reference to any one of the second aspect or the first to the sixth possible implementations of the second aspect, in a seventh possible implementation of the second aspect, the scheduling module is specifically configured to perform round-robin scheduling on the switch queue corresponding to each switch according to a report message weight that is pre-allocated to each switch.

In the embodiments of the present disclosure, the controller respectively stores, in a switch queue corresponding to each switch, a received report message that is sent by each switch. The controller no longer separately processes the report message sent by each switch, but performs round-robin scheduling on the report message in each switch queue. Therefore, the controller no longer directly processes a report message sent by an attacked switch and then processes a report message sent by another switch, but performs round-robin scheduling on all the report messages sent by the switches after the report messages are stored for a length of time. Therefore, during message attack defense, a processing time of non-attacking traffic is prevented from being prolonged during an attack, and a normal response to a service request of a normal user is ensured.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

To make the objectives, technical solutions, and advantages of the present disclosure clearer, the following further describes the present disclosure in detail with reference to the accompanying drawings. Apparently, the described embodiments are merely a part rather than all of the embodiments of the present disclosure. All other embodiments obtained by persons of ordinary skill in the art based on the embodiments of the present disclosure without creative efforts shall fall within the protection scope of the present disclosure.

The present disclosure provides a message attack defense method and apparatus, so as to ensure a normal response to a service request of a normal user during message attack defense. The method and the apparatus are based on a same disclosure idea. The method and the apparatus have similar principles for resolving problems. Therefore, for implementation of the apparatus and the method, reference may be made to each other, and details of repeated parts are not described again.

The embodiments of the present disclosure provide a message attack defense method and apparatus. A controller maintains a shared multi-queue structure according to a quantity of connected switches, that is, establishes a switch queue for each switch, and all switch queues form the shared multi-queue structure. After receiving a report message sent by any switch, the controller inserts the received report message into a switch queue corresponding to the switch. The controller no longer separately processes the report message sent by each switch, but performs round-robin scheduling on the report message in each switch queue. Therefore, the controller no longer directly processes a report message sent by an attacked switch and then processes a report message sent by another switch, but performs round-robin scheduling on all the report messages sent by the switches. Therefore, during message attack defense, a processing time of non-attacking traffic is prevented from being prolonged during an attack, and a normal response to a service request of a normal user is ensured.

Figure 1:
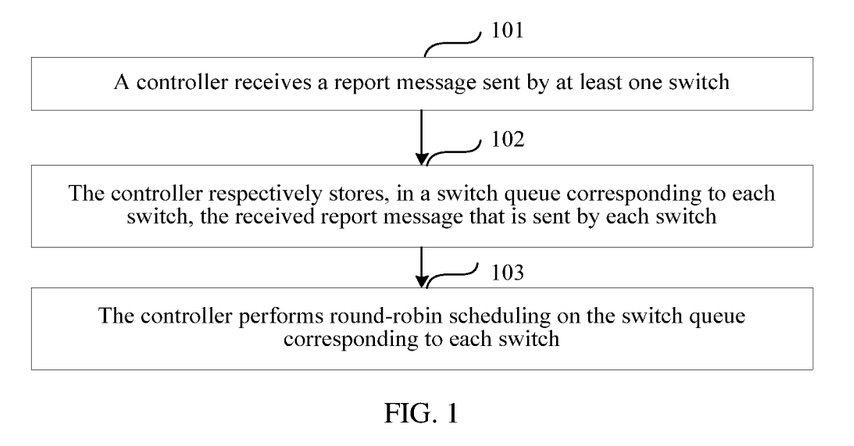
FIG. 1 is a flowchart of a message attack defense method according to an embodiment of the present disclosure.

An embodiment of the present disclosure provides a message attack defense method. As shown in FIG. 1, the method includes the following steps.

Step 101: A controller receives a report message sent by at least one switch.

Step 102: The controller respectively stores, in a switch queue corresponding to each switch, the received report message that is sent by each switch.

Step 103: The controller performs round-robin scheduling on the switch queue corresponding to each switch.

It should be noted that when performing round-robin scheduling on the switch queue corresponding to each switch, the controller may further receive a report message sent by at least one switch. Therefore, when performing round-robin scheduling on the switch queue corresponding to each switch, the controller may further respectively store, in a switch queue corresponding to the at least one switch, the received report message that is sent by each switch. Therefore, storage of the report message may be synchronously performed with round-robin scheduling processing.

A report message includes an asynchronous message sent by a switch or a message sent by a switch to the controller, for example, a packet-in message. After the switch receives a data packet sent by a host, if the switch cannot find a matching flow table rule, the switch encapsulates the data packet into a packet_in message, and reports the packet_in message to the controller. Alternatively, the switch finds a matching flow table rule, and if the rule indicates reporting the data packet to the controller, the switch also encapsulates the data packet into a packet_in message, and reports the packet_in message to the controller.

A subsequent description is performed by using a packet-in message as an example, for another message, reference may be made for implementation, and details are not described in this embodiment of the present disclosure again.

In this embodiment of the present disclosure, the controller respectively stores, in a switch queue corresponding to each switch, a received report message that is sent by each switch. The controller no longer separately processes the report message sent by each switch, but performs round-robin scheduling on the report message in each switch queue. Therefore, the controller no longer directly processes a report message sent by an attacked switch and then processes a report message sent by another switch, but performs round-robin scheduling on all the report messages sent by the switches after the report messages are stored for a length of time. Therefore, during message attack defense, a processing time of non-attacking traffic is prevented from being prolonged during an attack, and a normal response to a service request of a normal user is ensured.

Specifically, when performing round-robin scheduling on the switch queue corresponding to each switch, the controller respectively performs, according to a preset quantity of report messages that need to be scheduled when the switch queue is scheduled, round-robin scheduling on the switch queue corresponding to each switch.

The preset quantity of report messages that need to be scheduled when the switch queue is scheduled may be determined according to a report message weight that is pre-allocated to each switch. Specifically, the report message weight may be allocated to each switch by a manager by using a man-machine interface.

When performing round-robin scheduling on the switch queue corresponding to each switch, the controller may specifically use the following manner, including: determining, by the controller, a report message weight of each switch; determining, by the controller according to the report message weight of each switch queue, a quantity of scheduled packet-in messages in a currently scheduled switch queue in a scheduling period; and scheduling, by the controller according to the determined quantity of packet-in messages in the currently scheduled switch queue, the packet-in messages in the switch queue to be dequeued for processing.

It is assumed that a quantity of switches connected to the controller is n, that is, switch queues corresponding to the switches are respectively S1, S2, ..., and Sn, and determined report message weights of the switches are $W_{Si}$, where i=1, 2, ..., or n. When performing round-robin scheduling on the $i^{th}$ switch queue (that is, a switch queue Si), the controller extracts $$\left\lfloor \frac{w_{Si}}{\min(w_{S1}, w_{S2}, \cdots, w_{Sn})} \right\rfloor$$

packet-in messages from the queue for processing. Therefore, it is ensured that packet-in messages in a switch queue corresponding to an attacked switch do not block processing of packet-in messages of another common switch, and a function of defense by means of isolation is achieved.

Specifically, the foregoing weighted round-robin scheduling procedure may be described by using the following pseudocode. The weighted round-robin scheduling procedure includes the following.

Input: pktinMQueue: a MAP formed by switch queues of switches, activeSwitches: a currently activated switch and a weight wsi thereof.

```
 1: While True:
 2:    For key in pktinMQueue.keySet( ):
 3:    //pktinMQueue uses <dpid, Queue, ws> to maintain all the queues
 4:       If pktinMQueue.get(key).size>o:
 5:          //If there is a waiting message in a current switch queue, processing is performed
 6:          ... ...
 7:          OFSwitchImpl sw = (OFSwitchImpl)activeSwitches.get(key);
 8:             //Obtain a switch instance corresponding to the current queue 9:             While (i ≤ ⌊w_{s_i} / min(w_{s_1}, w_{s_2}, ... , w_{s_n})⌋):

10:             OFPacket_in pi = pktinMQueue.get(key).poll( );
11:                //Pop up a packet_in message at the head of the queue
12:             handlePktin(sw, pi);  //Process the message
13:             i++;
14:          End While
15:          ... ...
16:          Sw.flush( );  //Send a processed response message
17:       End if
18:    End For
19: End While
```

Contention of packet-in message processing between switch queues is resolved by using the foregoing method, but some disadvantages may exist: from the perspective of a host (Host), Hosts are respectively connected to switches, a message sent by a host is forwarded by using a switch, and if a data packet forwarding rule matching the message sent by the host does not exist in the switch, the message is sent to the controller by using a packet-in message. When a host attacks the controller by sending a packet-in message packet, when scheduling packet-in messages in a switch queue connected to the host, during each round-robin scheduling, the controller may first process a message sent by the attacking host. Consequently, in a switch connected to the host, a packet-in message sent by another normal host cannot be received and processed in time. Therefore, implementation is performed in the following implementation.

In an embodiment, that the controller stores, in a switch queue corresponding to each switch, the received report message that is sent by each switch may specifically uses the following manner.

a. The controller determines a switch queue to which the report message belongs.

The switch queue may be determined according to identification information of a switch that is carried in the report message. The identification information of the switch may be a port number of the switch, or may be address information, or the like.

b. The controller determines whether a host queue corresponding to the switch queue to which the report message belongs exists, where the host queues is host queues corresponding to hosts connected to a switch corresponding to the switch queue to which the report message belongs.

The host queue of each host connected to the switch corresponds to the switch queue of the switch.

c. When determining that the host queue corresponding to the switch queue to which the report message belongs does not exist, and a quantity of report messages that are already stored in the switch queue to which the report message belongs is greater than a first threshold, the controller establishes a host queue corresponding to the switch queue to which the report message belongs, and inserts the report message into the host queue corresponding to the switch queue to which the report message belongs.

When establishing the host queue corresponding to the switch queue to which the report message belongs, the controller may establish the host queue according to the report message and based on identification information of the host, where the identification information of the host may be a port number of the host, or may be address information, or the like.

The report message may further carry the identification information of the host, and the host queue corresponding to the switch queue to which the report message belongs may be determined according to the identification information of the host, so as to insert the report message into the host queue.

When the controller performs round-robin scheduling on the switch queue corresponding to each switch, if it is determined that a currently scheduled switch queue is empty, the controller determines, according to quantities of report messages that are already stored in host queues corresponding to the currently scheduled switch queue and a second threshold, priorities of the host queues corresponding to the currently scheduled switch queue.

Specifically, that the controller determines, according to quantities of report messages that are already stored in the host queues and a second threshold, priorities of the host queues may be that initially established priorities of the host queues are the same and may be all at a first priority level. When it is detected that a quantity of report messages in a particular host queue reaches the second threshold, it is determined that the host is an attack source, and a priority of the host queue may be set to a second priority level. The second priority level is lower than the first priority level.

The controller performs round-robin scheduling on the host queues according to the priorities of the host queues corresponding to the currently scheduled switch queue.

Optionally, when the controller performs round-robin scheduling on the host queues according to the priorities of the host queues corresponding to the currently scheduled switch queue, if it is determined that the quantities of report messages that are already stored in the host queues corresponding to the currently scheduled switch queue are all less than a third threshold, if the controller receives a report message sent by a switch corresponding to the currently scheduled switch queue, the controller inserts, into the currently scheduled switch queue, the received report message that is sent by the switch corresponding to the currently scheduled switch queue.

If the controller receives a report message that is sent by a switch corresponding to a switch queue that is not currently scheduled, the controller determines, according to a quantity of report messages that are stored in the switch queue and the third threshold, whether to store the received report message in a switch queue to which the received report message belongs.

Specifically, a controller respectively establishes a switch queue for each switch connected to the controller. The switch is connected to hosts. When a host initiates an attack, that is, a quantity of packet-in messages of a switch queue corresponding to a switch connected to the host is greater than the first threshold, a host queue is established, according to a port number of the host, for the switch connected to the attacking host. Certainly, a host queue may be further respectively established for each host connected to the switch. Specifically, priorities of the established host queues may be further set, and initially established priorities of the host queues are the same, and are all the first priority level. When a quantity of packet-in messages in a particular host queue reaches the second threshold, it is determined that the host is an attack source, and a priority of the host queue is set to the second priority level. The second priority level is lower than the first priority level. After an attack ends, quantities of packet-in messages in the host queues are all less than the third threshold. The third threshold is less than the second threshold.

By means of the foregoing solution, host queues are respectively established for hosts connected to an attacked switch, and a packet-in message of an attacked host and a packet-in message of another normal host may be separately stored and processed in a round robin manner, so as to ensure that the packet-in message of another normal host can be processed in time.

Optionally, if host queues corresponding to a particular switch are already established, after inserting, into a switch queue corresponding to the switch, the received report message that is sent by the switch, the controller may determine quantities of report messages in the established host queues corresponding to the switch queue. When determining that a host queue without a stored report message exists in the host queues, the controller deletes the host queue without a stored report message; or when determining that no report messages are stored in all the host queues corresponding to the switch queue, the controller deletes the host queues corresponding to the switch queue.

Optionally, if it is determined that the host queues corresponding to the currently scheduled switch queue exist, after the controller inserts, into the currently scheduled switch queue, the received report message that is sent by the switch corresponding to the currently scheduled switch queue, when determining that a host queue without a report message exists in the host queues corresponding to the currently scheduled switch queue, the controller deletes the host queue without a report message; or when determining that no report messages are stored in all the host queues corresponding to the currently scheduled switch queue, the controller deletes the host queues corresponding to the currently scheduled switch queue.

Optionally, if it is determined that the host queues exist, when performing round-robin scheduling on the switch queue corresponding to each switch, the controller monitors host queues of each switch. When determining that a host queue without a report message exists in host queues corresponding to any switch queue, the controller deletes the host queue without a report message; or when determining that no report messages are stored in host queues corresponding to any switch queue, the controller deletes the host queues corresponding to the currently scheduled switch queue.

In an optional embodiment, after the controller determines whether the host queue corresponding to the switch queue to which the report message belongs exists, when determining that the host queue corresponding to the switch queue does not exist, and determining the quantity of report messages that are already stored in the switch queue to which the report message belongs is less than the first threshold, the controller inserts the report message into the switch queue to which the report message belongs.

In an optional embodiment, after the controller determines whether the host queue corresponding to the switch queue to which the report message belongs exists, when determining that the host queue corresponding to the switch queue to which the report message belongs exists, and a quantity of report messages that are already stored in any host queue is greater than a fourth threshold and the quantity of report messages that are already stored in the switch queue to which the report message belongs is less than the first threshold, the controller inserts the report message into the host queue corresponding to the switch queue to which the report message belongs, where the fourth threshold is less than the second threshold.

The fourth threshold may be equal to the third threshold, or may not be equal to the third threshold.

In an optional embodiment, after the controller determines whether the host queue corresponding to the switch queue to which the report message belongs exists, when determining that the host queue corresponding to the switch queue to which the report message belongs exists, and a quantity of report messages that are already stored in each host queue is less than a fifth threshold, and the quantity of report messages that are already stored in the switch queue to which the report message belongs is less than the first threshold, the controller inserts the report message into the switch queue to which the report message belongs, where the fifth threshold is less than the second threshold.

The fifth threshold may be equal to the third threshold or the fourth threshold, or may not be equal to the third threshold or the fourth threshold.

Figure 2:
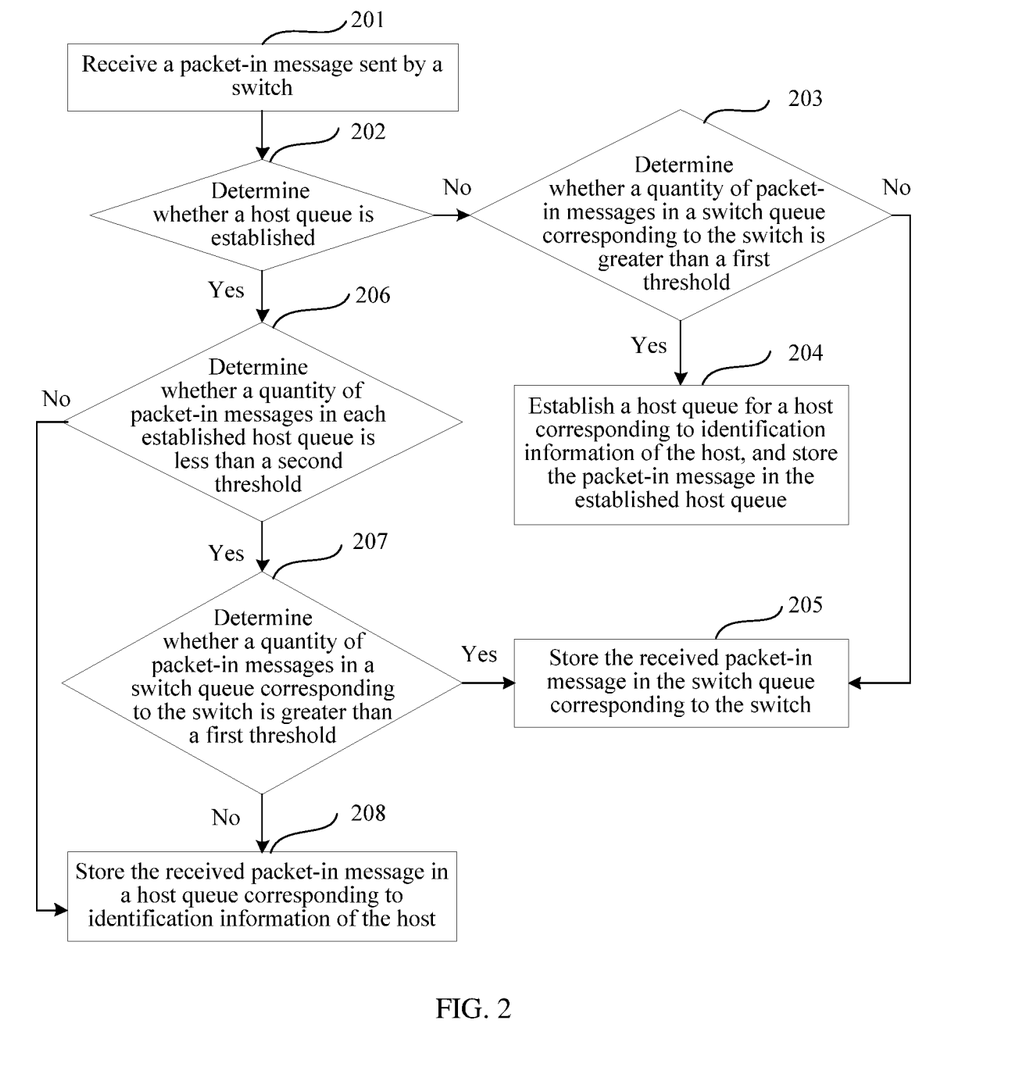
FIG. 2 is a flowchart of another message attack defense method according to an embodiment of the present disclosure.

Specifically, a procedure of receiving and enqueuing a packet-in message by a controller is shown in FIG. 2. The controller respectively pre-establishes a switch queue for each switch connected to the controller. A switch is described below by using a packet-in message as an example.

Step 201: Receive a packet-in message sent by a switch, and perform step 202. The packet-in message carries identification information of a host connected to the switch.

Step 202: Determine whether a host queue is established, and if the host queue is not established, perform step 203, or if the host queue is established, perform step 206. The host queues is host queues corresponding to all hosts connected to the foregoing switch.

Step 203: Determine whether a quantity of packet-in messages in a switch queue corresponding to the switch is greater than a first threshold, and if yes, perform step 204, or if not, perform step 205.

Step 204: Establish a host queue for a host corresponding to the identification information of the host, and store the packet-in message in the established host queue.

Step 205: Store the received packet-in message in the switch queue corresponding to the switch.

Step 206: Determine whether a quantity of packet-in messages in each established host queue is less than a second threshold, and if yes, perform step 207, or if not, perform step 208.

Step 207: Determine whether a quantity of packet-in messages in a switch queue corresponding to the switch is greater than a first threshold, and if yes, perform step 205, or if not, perform step 208.

Step 208: Store the received packet-in message in a host queue corresponding to the identification information of the host.

Optionally, when the controller schedules, according to the determined quantity of packet-in messages in each switch queue, packet-in messages in each switch queue to be dequeued for processing, if it is determined that a currently scheduled switch queue is empty, and determining that any established host queue corresponding to the currently scheduled switch queue is not empty, the controller determines, according to a packet-in message weight of each switch, a quantity of packet-in messages scheduled from the currently scheduled switch queue, and schedules a corresponding quantity of report messages from host queues that are not empty and that correspond to the currently scheduled switch queue to send. The corresponding quantity is the determined quantity of packet-in messages.

Optionally, the determining, according to a packet-in message weight of each switch, a quantity of packet-in messages scheduled from the currently scheduled switch queue, and scheduling a corresponding quantity of report messages from host queues that are not empty and that correspond to the currently scheduled switch queue to send may specifically use the following manner: preferentially scheduling a first quantity of report messages from a host queue whose quantity of report messages is not greater than the second threshold (that is, a host queue corresponding to a first priority level) in the host queues that are not empty and that correspond to the currently scheduled switch queue; or scheduling a second quantity of report messages from another host queue whose quantity of report messages is greater than the second threshold (that is, a host queue corresponding to a second priority level) in the host queues that are not empty and that correspond to the currently scheduled switch queue, where a sum of the first quantity and the second quantity is less than or equal to the quantity of packet-in messages, and when the first quantity is greater than or equal to the quantity of packet-in messages, the second quantity is zero.

For example, it is determined that a corresponding quantity of scheduled report messages of a particular switch queue is 10, if a total sum of quantities of report messages of host queues whose quantities of report messages are not greater than the second threshold in the host queues that are not empty and that correspond to the currently scheduled switch queue is greater than or equal to 10, during current round-robin scheduling, 10 report messages are scheduled from the host queues whose quantities of report messages are not greater than the second threshold. If a total sum of quantities of report messages of host queues whose quantities of report messages are not greater than the second threshold in host queues that are not empty and that correspond to a currently scheduled switch queue is less than 10, for example, eight, eight report messages are scheduled from the host queues whose quantities of report messages are not greater than the second threshold, and then two report messages are scheduled from other host queues whose quantities of report messages are greater than the second threshold in the host queues that are not empty and that correspond to the currently scheduled switch queue.

If it is determined that host queues corresponding to any switch queue are empty, the host queues corresponding to the switch queue are deleted.

Figure 3:
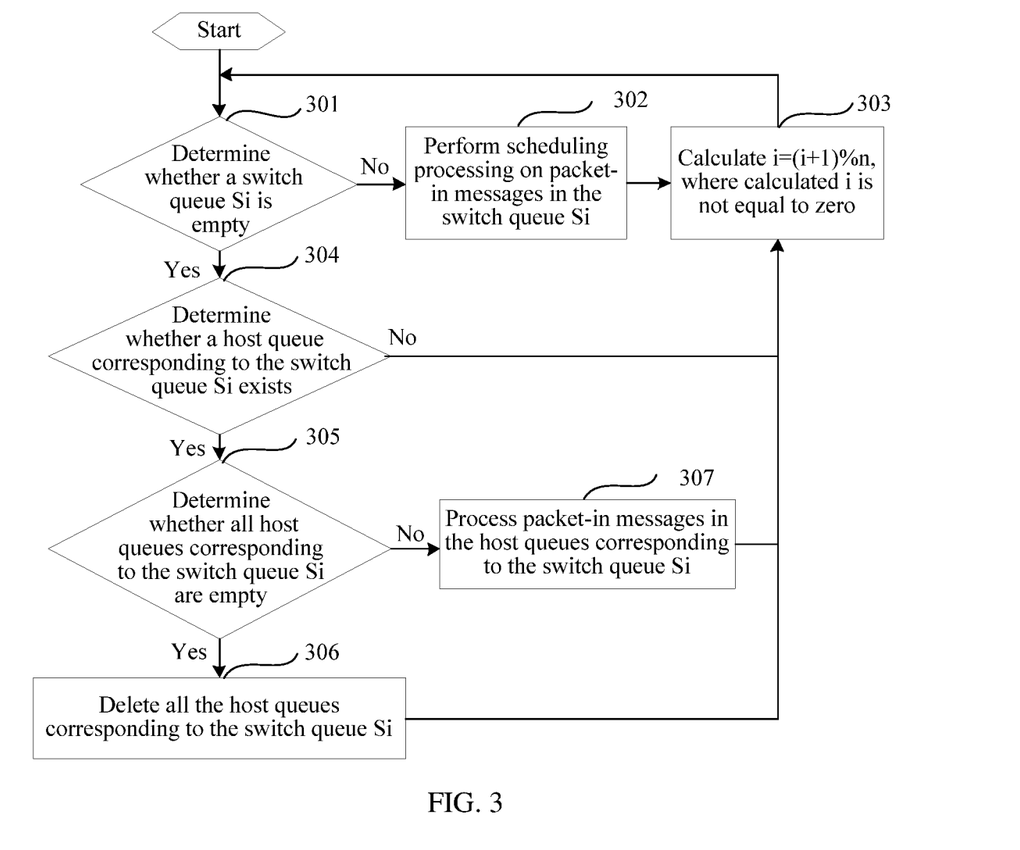
FIG. 3 is a flowchart of still another message attack defense method according to an embodiment of the present disclosure.

Specifically, a procedure of scheduling packet-in messages in a switch queue and a host queue to be dequeued by a controller is shown in FIG. 3.

It is assumed that a quantity of switches connected to the controller is n, that is, switch queues corresponding to the switches are respectively S1, S2, . . . , and Sn, and determined report message weights of the switches are $W_{Si}$, where i=1, 2, . . . , or n. When performing round-robin scheduling on the $i^{th}$ switch queue (that is, a switch queue Si), the controller extracts $$\left\lfloor \frac{W_{Si}}{\min(W_{S1}, W_{S2}, \cdots, W_{Sn})} \right\rfloor$$

packet-in messages from the queue for processing.

Step 301: Determine whether the switch queue Si is empty, and if not, perform step 302, or if yes, perform step 304.

Step 302: Perform scheduling processing on packet-in messages in the switch queue Si, and perform step 303. Specifically, $$\left\lfloor \frac{W_{Si}}{\min(W_{S1}, W_{S2}, \cdots, W_{Sn})} \right\rfloor$$

packet-in messages may be extracted from the switch queue for processing.

Step 303: Calculate i=(i+1)% n, where calculated i is not equal to zero; and perform step 301.

Step 304: Determine whether a host queue corresponding to the switch queue Si exists, and if not, perform step 303, or if yes, perform step 305.

Step 305: Determine whether all host queues corresponding to the switch queue Si are empty, and if yes, perform step 306, or if not, perform step 307.

Step 306: Delete all the host queues corresponding to the switch queue Si, and perform step 303.

Step 307: Process packet-in messages in the host queues corresponding to the switch queue Si, and perform step 303.

The packet-in messages in the host queues corresponding to the switch queue Si are processed in a round-robin scheduling (Round Robin) manner. Details are as follows:

Round-robin scheduling is preferentially performed on unattacked host queues, so as to ensure that packet-in messages in the unattacked host queues can be processed in time. If priorities of host queues are established when the host queues are established previously, the host queues may be scheduled according to the priorities. A priority of an attacked host queue is the lowest, and is scheduled at last. For example, when a switch queue 2 is scheduled, and the switch queue 2 is empty, M packet-in messages are extracted from all host queues in a round-robin scheduling manner for processing, where $$M = \left\lfloor \frac{W_{S2}}{\min(W_{S1}, W_{S2}, \cdots, W_{sn})} \right\rfloor.$$

Figure 4:
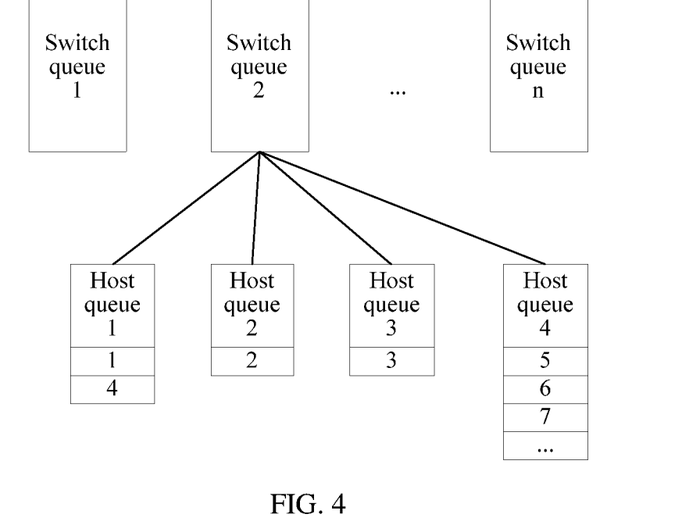
FIG. 4 is a schematic diagram of processing a report message according to an embodiment of the present disclosure.

If a quantity of messages of all unattacked host queues is less than M, a packet-in message in an attacked host queue is scheduled. As shown in FIG. 4, it is assumed that M=5, a host queue 4 is a host queue corresponding to an attacked host. During scheduling, packet-in messages numbered 1, 2, 3, and 4 are extracted in sequence. A quantity of messages in an unattacked host queue is less than five, and a packet-in message numbered 5 is extracted from the host queue 4 for scheduling.

Figure 5:
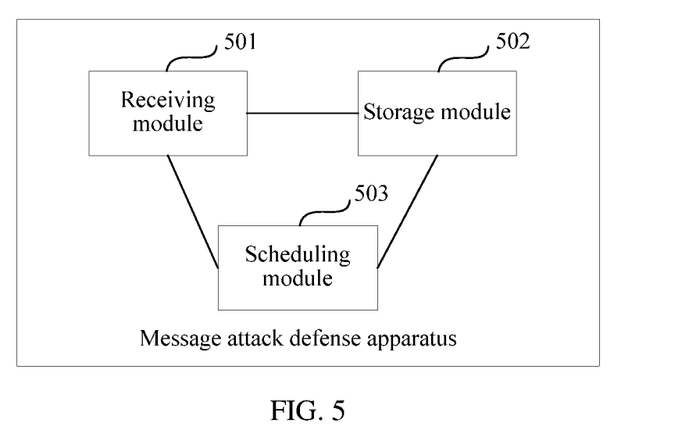
FIG. 5 is a schematic diagram of a message attack defense apparatus according to an embodiment of the present disclosure.

An embodiment of the present disclosure further provides a message attack defense apparatus. As shown in FIG. 5, the apparatus is applied to a controller, and the apparatus includes: a receiving module 501, configured to receive a report message sent by at least one switch; a storage module 502, configured to respectively store, in a switch queue corresponding to each switch, the report message that is sent by each switch and that is received by the receiving module 501; and a scheduling module 503, configured to perform round-robin scheduling on the switch queue that is stored by the storage module 502 and that corresponds to each switch.

In this embodiment of the present disclosure, the controller respectively stores, in a switch queue corresponding to each switch, a received report message that is sent by each switch. The controller no longer separately processes the report message sent by each switch, but performs round-robin scheduling on the report message in each switch queue. Therefore, the controller no longer directly processes a report message sent by an attacked switch and then processes a report message sent by another switch, but performs round-robin scheduling on all the report messages sent by the switches after the report messages are stored for a length of time. Therefore, a processing time of non-attacking traffic is prevented from being prolonged during an attack, and a case in which a service request of a normal user cannot be responded to is prevented. In addition, by improving a controller, burden of a switch is reduced, and forwarding efficiency of the switch is no longer affected.

Figure 6:
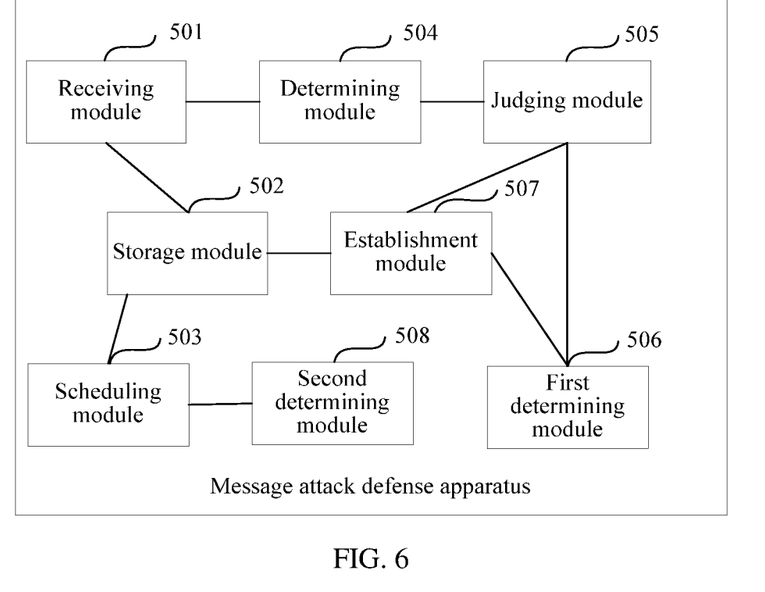
FIG. 6 is a schematic diagram of another message attack defense apparatus according to an embodiment of the present disclosure.

Optionally, as shown in FIG. 6, the apparatus may further include: a determining module 504, configured to determine a switch queue to which the report message belongs; a judging module 505, configured to determine whether a host queue corresponding to the switch queue to which the report message belongs exists, where the host queues is host queues corresponding to hosts connected to a switch corresponding to the switch queue to which the report message belongs; a first determining module 506, configured to: when the judging module 505 determines that the host queue corresponding to the switch queue to which the report message belongs does not exist, determine that a quantity of report messages that are already stored in the switch queue to which the report message belongs is greater than a first threshold; an establishment module 507, configured to: when the judging module 505 determines that the host queue corresponding to the switch queue to which the report message belongs does not exist, and the first determining module 506 determines that the quantity of report messages that are already stored in the switch queue to which the report message belongs is greater than the first threshold, establish a host queue corresponding to the switch queue to which the report message belongs, where the storage module 502 is specifically configured to insert the report message into the host queue that is established by the establishment module 507 and that corresponds to the switch queue to which the report message belongs; and a second determining module 508, configured to: when the scheduling module 503 performs round-robin scheduling on the switch queue corresponding to each switch, if it is determined that a currently scheduled switch queue is empty, determine priorities of host queues according to quantities of report messages that are already stored in the host queues corresponding to the currently scheduled switch queue and a second threshold, where the scheduling module 503 is specifically configured to perform round-robin scheduling on the host queues according to the priorities that are of the host queues corresponding to the currently scheduled switch queue and that are determined by the second determining module 508.

Optionally, the apparatus may further include a third determining module, where the third determining module is configured to: when the scheduling module 503 performs round-robin scheduling on the host queues according to the priorities of the host queues corresponding to the currently scheduled switch queue, determine whether the quantities of report messages that are already stored in the host queues corresponding to the currently scheduled switch queue are all less than a third threshold; and the storage module 502 is configured to: when the third determining module determines whether the quantities of report messages that are already stored in the host queues corresponding to the currently scheduled switch queue are all less than the third threshold, if the receiving module 501 receives a report message sent by a switch corresponding to the currently scheduled switch queue, insert, into the currently scheduled switch queue, the report message that is sent by the switch corresponding to the currently scheduled switch queue and that is received by the receiving module 501, where the third threshold is less than the second threshold.

Optionally, the apparatus further includes: a fourth determining module, configured to: after the storage module 502 inserts, into the currently scheduled switch queue, the report message that is sent by the switch corresponding to the currently scheduled switch queue and that is received by the receiving module 501, determine whether a host queue without a stored report message exists in the host queues corresponding to the currently scheduled switch queue; and a deletion module, configured to: when the fourth determining module determines that the host queue without a report message exists in the host queues corresponding to the currently scheduled switch queue, delete the host queue without a report message; or a fourth determining module, configured to: after the storage module 502 inserts, into the currently scheduled switch queue, the report message that is sent by the switch corresponding to the currently scheduled switch queue and that is received by the receiving module 501, determine whether no report messages are stored in all the host queues corresponding to the currently scheduled switch queue; and a deletion module, configured to: when the fourth determining module determines that no report messages are stored in all the host queues corresponding to the currently scheduled switch queue, delete the host queues corresponding to the currently scheduled switch queue.

Optionally, the first determining module 506 is further configured to determine that the quantity of report messages that are already stored in the switch queue to which the report message belongs is less than the first threshold; and the storage module 502 is further configured to: when the judging module 505 determines that the host queue corresponding to the switch queue to which the report message belongs does not exist, and the first determining module 506 determines that the quantity of report messages that are already stored in the switch queue to which the report message belongs is less than the first threshold, insert the report message into the switch queue to which the report message belongs.

Optionally, the apparatus further includes: a fifth determining module, configured to: when the judging module 505 determines that the host queue corresponding to the switch queue to which the report message belongs exists, determine that a quantity of report messages that are already stored in any host queue is greater than a fourth threshold and the quantity of report messages that are already stored in the switch queue to which the report message belongs is less than the first threshold, where the storage module 502 is further configured to: when the judging module 505 determines that host queue corresponding to the switch queue to which the report message belongs exists, and the fifth determining module determines that the quantity of report messages that are already stored in any host queue is greater than the fourth threshold and the quantity of report messages that are already stored in the switch queue to which the report message belongs is less than the first threshold, insert the report message into the host queue corresponding to the switch queue to which the report message belongs, where the fourth threshold is less than the second threshold.

Optionally, the apparatus may further include: a sixth determining module, configured to: when the judging module 505 determines that the host queue corresponding to the switch queue to which the report message belongs exists, determine that a quantity of report messages that are already stored in each host queue is less than a fifth threshold and the quantity of report messages that are already stored in the switch queue to which the report message belongs is less than the first threshold, where the storage module 502 is further configured to: when the judging module 505 determines that host queue corresponding to the switch queue to which the report message belongs exists, and the sixth determining module determines that the quantity of report messages that are already stored in each host queue is less than the fifth threshold and the quantity of report messages that are already stored in the switch queue to which the report message belongs is less than the first threshold, insert the report message into the switch queue to which the report message belongs, where the fifth threshold is less than the second threshold.

Specifically, the scheduling module 503 is configured to perform round-robin scheduling on the switch queue corresponding to each switch according to a report message weight that is pre-allocated to each switch.

Figure 7:
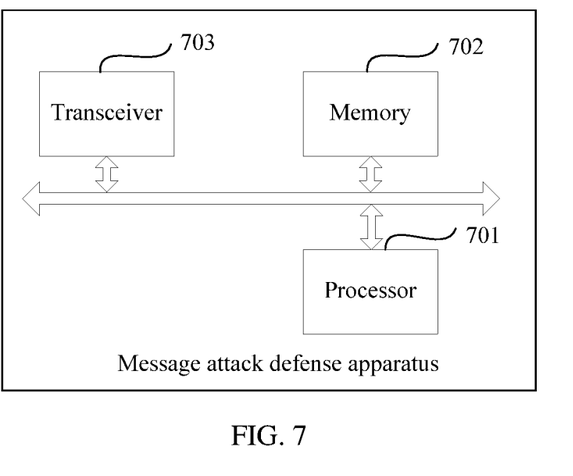
FIG. 7 is a schematic diagram of still another message attack defense apparatus according to an embodiment of the present disclosure.

The present disclosure further provides a message attack defense apparatus. As shown in FIG. 7, the apparatus may be disposed in a controller. The apparatus is configured to perform the method shown in FIG. 1, FIG. 2, or FIG. 3, and specifically includes a processor 701, a memory 702, and a transceiver 703. The processor 701 is separately connected to the memory 702 and the transceiver 703. This embodiment of the present disclosure does not limit a specific connection medium between the foregoing components. In this embodiment of the present disclosure, in FIG. 7, the memory 702, the processor 701, and the transceiver 703 are connected by using a bus. In FIG. 7, a bold line represents the bus. Connection manners between other components are merely for illustration purposes, and are not limited.

The memory 702 in this embodiment of the present disclosure is configured to store program code executed by the processor 701, and may be a read-only memory (ROM), a random-access memory (RAM), an electrically erasable programmable read-only memory (EEPROM), a disk storage medium or another disk storage device, or any other medium that can be configured to carry or store expected program code having an instruction or a data structure form and that can be accessed by a computer, but is not limited thereto. For example, the memory 702 may be a combination of the foregoing memories.

The processor 701 performs a program stored in the memory 702, to implement the message attack defense method shown in FIG. 1, FIG. 2, or FIG. 3 in the present disclosure.

The transceiver 703 receives a report message sent by at least one switch.

The processor 701 respectively stores, in a switch queue corresponding to each switch, the report message that is sent by each switch and that is received by the transceiver 703.

The processor 701 performs round-robin scheduling on the switch queue corresponding to each switch.

The switch queue corresponding to each switch is stored in the memory 702.

That the processor 701 stores, in a switch queue corresponding to each switch, the report message that is sent by each switch and that is received by the transceiver 703 may specifically use the following manner.

The processor 701 determines a switch queue to which the report message received by the transceiver 703 belongs, and determines whether a host queue corresponding to the switch queue to which the report message belongs exists, where the host queues is host queues corresponding to hosts connected to a switch corresponding to the switch queue to which the report message belongs.

When determining that the host queue corresponding to the switch queue to which the report message belongs does not exist, and determining that a quantity of report messages that are already stored in the switch queue to which the report message belongs is greater than a first threshold, the controller establishes a host queue corresponding to the switch queue to which the report message belongs, and inserts the report message into the host queue corresponding to the switch queue to which the report message belongs.

When the processor 701 performs round-robin scheduling on the switch queue corresponding to each switch, if it is determined that a currently scheduled switch queue is empty, the processor 701 determines, according to quantities of report messages that are already stored in host queues corresponding to the currently scheduled switch queue and a second threshold, priorities of the host queues corresponding to the currently scheduled switch queue, and then performs round-robin scheduling on the host queues according to the priorities of the host queues corresponding to the currently scheduled switch queue.

The host queue corresponding to each switch is stored in the memory 702. The host queue of each host connected to the switch corresponds to the switch queue of the switch.

When the processor 701 performs round-robin scheduling on the host queues according to the priorities of the host queues corresponding to the currently scheduled switch queue, when it is determined that the quantities of report messages that are already stored in the host queues corresponding to the currently scheduled switch queue are all less than a third threshold, if the transceiver 703 receives a report message sent by a switch corresponding to the currently scheduled switch queue, the processor 701 inserts, into the currently scheduled switch queue, the report message that is sent by the switch corresponding to the currently scheduled switch queue and that is received by the transceiver 703, where the third threshold is less than the second threshold.

After inserting, into the currently scheduled switch queue, the report message that is sent by the switch corresponding to the currently scheduled switch queue and that is received by the transceiver 703, when determining that a host queue without a report message exists in the host queues corresponding to the currently scheduled switch queue, the processor 701 deletes the host queue without a report message; or when determining that no report messages are stored in all the host queues corresponding to the currently scheduled switch queue, the processor 701 deletes the host queues corresponding to the currently scheduled switch queue.

After determining whether the host queue corresponding to the switch queue to which the report message belongs exists, when determining that the host queue corresponding to the switch queue to which the report message belongs does not exist, and determining that a quantity of report messages that are already stored in the switch queue to which the report message belongs is less than the first threshold, the processor 701 inserts the report message received by the transceiver 703 into the switch queue to which the report message belongs.

When determining whether the host queue corresponding to the switch queue to which the report message belongs exists, when determining that the host queue corresponding to the switch queue to which the report message belongs exists, and determining that a quantity of report messages that are already stored in any host queue is greater than a fourth threshold and the quantity of report messages that are already stored in the switch queue to which the report message belongs is less than the first threshold, the processor 701 inserts the report message received by the transceiver 703 into the host queue corresponding to the switch queue to which the report message belongs, where the fourth threshold is less than the second threshold.

The fourth threshold may be equal to the third threshold, or may not be equal to the third threshold.

When determining whether the host queue corresponding to the switch queue to which the report message belongs exists, when determining that the host queue corresponding to the switch queue to which the report message belongs exists, and determining that a quantity of report messages that are already stored in each host queue is less than a fifth threshold, and the quantity of report messages that are already stored in the switch queue to which the report message belongs is less than the first threshold, the processor 701 inserts the report message received by the transceiver 703 into the switch queue to which the report message belongs, where the fifth threshold is less than the second threshold.

The fifth threshold may be equal to the third threshold or the fourth threshold, or may not be equal to the third threshold or the fourth threshold.

That the processor 701 performs round-robin scheduling on the switch queue corresponding to each switch may specifically use the following manner: performing round-robin scheduling on the switch queue corresponding to each switch according to a report message weight that is pre-allocated to each switch.

In this embodiment of the present disclosure, the processor 701 in the controller respectively stores, in a switch queue that is stored in the memory 702 and corresponds to each switch, a report message that is sent by the switch and that is received by the transceiver 703. The controller no longer separately processes the report message sent by each switch, but performs round-robin scheduling on report messages in all switch queues. Therefore, the controller no longer directly processes a report message sent by an attacked switch and then processes a report message sent by another switch, but performs round-robin scheduling on all the report messages sent by the switches after the report messages are stored for a length of time. Therefore, during message attack defense, a processing time of non-attacking traffic is prevented from being prolonged during an attack, and a normal response to a service request of a normal user is ensured.

Persons skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present disclosure have been described, persons skilled in the art can make changes and modifications to these embodiments once they learn the basic inventive concept. Therefore, the following claims are intended to be construed as to cover the embodiments and all changes and modifications falling within the scope of the present disclosure.

Obviously, persons skilled in the art can make various modifications and variations to the embodiments of the present disclosure without departing from the spirit and scope of the embodiments of the present disclosure. The present disclosure is intended to cover these modifications and variations provided that they fall within the scope of protection defined by the following claims and their equivalent technologies.

What is claimed is:

1. A method, comprising:
receiving, by a controller, a plurality of report messages sent by a plurality of switches;
determining, by the controller for each of the plurality of report messages, a respective switch queue to which the respective report message belongs, wherein each respective switch queue corresponds to a respective switch of the plurality of switches, and the respective switch queue to which the respective report message belongs is determined on the basis of the respective switch of the plurality of switches from which the respective report message was received;
storing, by the controller, each respective report message of the plurality of report messages in the determined respective switch queue to which the respective report message belongs; and
performing, by the controller, round-robin scheduling on the respective switch queue corresponding to each switch of the plurality of switches.

2. The method according to claim 1, wherein storing, by the controller, each respective report message of the plurality of report messages in the determined respective switch queue to which the respective report message belongs comprises:
determining, by the controller for each report message of the plurality of report messages, whether a respective host queue corresponding to the respective switch queue to which the respective report message belongs exists, wherein one or more host queues correspond to a host connected to a respective switch corresponding to the respective switch queue to which the respective report message belongs; and
when it is determined, for a first report message of the plurality of report messages, that no host queue corresponding to the switch queue to which the first report message belongs exists, and it is determined that a quantity of report messages that are already stored in the switch queue to which the first report message belongs is greater than a first threshold, establishing, by the controller, a host queue corresponding to the switch queue to which the first report message belongs, and inserting the first report message into the host queue corresponding to the switch queue to which the first report message belongs; and
wherein during the performing, by the controller, round-robin scheduling on the respective switch queue corresponding to each switch of the plurality of switches, when it is determined that no report message exists in a currently scheduled switch queue, the method further comprises:

determining, by the controller according to quantities of report messages that are already stored in host queues corresponding to the currently scheduled switch queue and a second threshold, priorities of the host queues corresponding to the currently scheduled switch queue; and
performing, by the controller, round-robin scheduling on the host queues corresponding to the currently scheduled switch queue according to the priorities of the host queues corresponding to the currently scheduled switch queue.

3. The method according to claim 2, wherein during the performing, by the controller, round-robin scheduling on the host queues corresponding to the currently scheduled switch queue according to the priorities of the host queues corresponding to the currently scheduled switch queue, the method further comprises:
when it is determined that the quantities of report messages that are already stored in the host queues corresponding to the currently scheduled switch queue are all less than a third threshold, and when the controller receives a report message sent by a switch corresponding to the currently scheduled switch queue, inserting, by the controller into the currently scheduled switch queue, the received report message that is sent by the switch corresponding to the currently scheduled switch queue, wherein the third threshold is less than the second threshold.

4. The method according to claim 3, wherein after inserting, into the currently scheduled switch queue, the received report message that is sent by the switch corresponding to the currently scheduled switch queue, the method further comprises:
when it is determined that a first host queue without any report message exists in the host queues corresponding to the currently scheduled switch queue, deleting the first host queue without a report message; or
when determined that no report messages are stored in all the host queues corresponding to the currently scheduled switch queue, deleting the host queues corresponding to the currently scheduled switch queue.

5. The method according to claim 2, wherein after determining, by the controller for each report message of the plurality of report messages, whether the respective host queue corresponding to the respective switch queue to which the respective report message belongs exists, the method further comprises:
when it is determined that no host queue corresponding to the switch queue to which the first report message belongs exists, and it is determined that a quantity of report messages that are already stored in the switch queue to which the first report message belongs is less than the first threshold, inserting, by the controller, the first report message into the switch queue to which the first report message belongs.

6. The method according to claim 2, wherein after determining, by the controller for each report message of the plurality of report messages, whether the respective host queue corresponding to the respective switch queue to which the respective report message belongs exists, the method further comprises:
when it is determined that the host queue corresponding to the switch queue to which the first report message belongs exists, and it is determined that a quantity of report messages that are already stored in any host queue is greater than a fourth threshold and the quantity of report messages that are already stored in the switch queue to which the first report message belongs is less than the first threshold, inserting, by the controller, the first report message into the host queue corresponding to the switch queue to which the first report message belongs, wherein the fourth threshold is less than the second threshold.

7. The method according to claim 2, wherein after determining, by the controller for each report message of the plurality of report messages, whether the respective host queue corresponding to the respective switch queue to which the respective report message belongs exists, the method further comprises:
when it is determined that the host queue corresponding to the switch queue to which the first report message belongs exists, and it is determined that a quantity of report messages that are already stored in each host queue is less than a fifth threshold and the quantity of report messages that are already stored in the switch queue to which the first report message belongs is less than the first threshold, inserting, by the controller, the first report message into the switch queue to which the first report message belongs, wherein the fifth threshold is less than the second threshold.

8. The method according to claim 1, wherein performing, by the controller, round-robin scheduling on the respective switch queue corresponding to each switch comprises:
performing, by the controller, round-robin scheduling on the respective switch queue corresponding to each switch according to a report message weight that is pre-allocated to each switch.

9. An apparatus, comprising:
a processor;
a receiver, configured to receive a plurality of report messages sent by a plurality of switches; and
a non-transitory memory, configured to store a program to be executed by the processor, the program including instructions for:
determining, for each of the plurality of report messages, a respective switch queue to which the respective report message belongs, wherein each respective switch queue corresponds to a respective switch of the plurality of switches, and the respective switch queue to which the respective report message belongs is determined on the basis of the respective switch of the plurality of switches from which the respective report message was received;
storing each respective report message of the plurality of report messages in the determined respective switch queue to which the respective report message belongs; and
performing round-robin scheduling on the respective switch queue that corresponds to each switch of the plurality of switches.

10. The apparatus according to claim 9, wherein the program further includes instructions for:
determining, for each report message of the plurality of report messages, whether a respective host queue corresponding to the respective switch queue to which the respective report message belongs exists, wherein one or more host queues correspond to hosts connected to the respective switch corresponding to the respective switch queue to which the respective report message belongs;
determine that a quantity of report messages that are already stored in a switch queue to which a first report message of the plurality of report messages belongs is greater than a first threshold;
when it is determined that no host queue corresponding to the switch queue to which the first report message belongs exists, and it is determined that the quantity of report messages that are already stored in the switch queue to which the first report message belongs is greater than the first threshold, establishing a host queue corresponding to the switch queue to which the first report message belongs;
inserting the first report message into the host queue that corresponds to the switch queue to which the first report message belongs; and
when performing round-robin scheduling on the respective switch queue corresponding to each switch, and when it is determined that a currently scheduled switch queue is empty, determine priorities of host queues according to quantities of report messages that are already stored in the host queues corresponding to the currently scheduled switch queue and a second threshold, wherein the round-robin scheduling is performed on the host queues according to the priorities that are of the host queues corresponding to the currently scheduled switch queue.

11. The apparatus according to claim 10, wherein the program further includes instructions for:
when the round-robin scheduling is performed on the host queues according to the priorities of the host queues corresponding to the currently scheduled switch queue, determining whether the quantities of report messages that are already stored in the host queues corresponding to the currently scheduled switch queue are all less than a third threshold; and
when it is determined that the quantities of report messages that are already stored in the host queues corresponding to the currently scheduled switch queue are all less than the third threshold, and when the receiver receives a report message sent by a switch corresponding to the currently scheduled switch queue, inserting, into the currently scheduled switch queue, the report message that is sent by the switch corresponding to the currently scheduled switch queue, wherein the third threshold is less than the second threshold.

12. The apparatus according to claim 11, wherein the program further includes instructions for:
after inserting, into the currently scheduled switch queue, the report message that is sent by the switch corresponding to the currently scheduled switch queue, determining whether a host queue without any report message exists in the host queues corresponding to the currently scheduled switch queue; and
when it is determined that a host queue without any report message exists in the host queues corresponding to the currently scheduled switch queue, deleting the host queue without any report message; or
after inserting, into the currently scheduled switch queue, the report message that is sent by the switch corresponding to the currently scheduled switch queue, determining whether no report messages are stored in all the host queues corresponding to the currently scheduled switch queue; and
when it is determined that no report messages are stored in all the host queues corresponding to the currently scheduled switch queue, deleting the host queues corresponding to the currently scheduled switch queue.

13. The apparatus according to claim 10, wherein the program further includes instructions for:

determining that the quantity of report messages that are already stored in the switch queue to which the first report message belongs is less than the first threshold; and when it is determined that no host queue corresponding to the switch queue to which the first report message belongs exists, and it is determined that the quantity of report messages that are already stored in the switch queue to which the first report message belongs is less than the first threshold, inserting the first report message into the switch queue to which the first report message belongs.

14. The apparatus according to claim 10, wherein the program further includes instructions for:

when it is determined that the host queue corresponding to the switch queue to which the first report message belongs exists, determine that a quantity of report messages that are already stored in any host queue is greater than a fourth threshold and the quantity of report messages that are already stored in the switch queue to which the first report message belongs is less than the first threshold; and when it is determined that the host queue corresponding to the switch queue to which the first report message belongs exists, and it is determined that that the quantity of report messages that are already stored in any host queue is greater than the fourth threshold and the quantity of report messages that are already stored in the switch queue to which the first report message belongs is less than the first threshold, insert the first report message into the host queue corresponding to the switch queue to which the first report message belongs, wherein the fourth threshold is less than the second threshold.

15. The apparatus according to claim 10, wherein the program further includes instructions for:

when it is determined that the host queue corresponding to the switch queue to which the first report message belongs exists, determine that a quantity of report messages that are already stored in each host queue is less than a fifth threshold and the quantity of report messages that are already stored in the switch queue to which the first report message belongs is less than the first threshold; and when it is determined that the host queue corresponding to the switch queue to which the first report message belongs exists, and it is determined that the quantity of report messages that are already stored in each host queue is less than the fifth threshold and the quantity of report messages that are already stored in the switch queue to which the first report message belongs is less than the first threshold, insert the first report message into the switch queue to which the first report message belongs, wherein the fifth threshold is less than the second threshold.

16. The apparatus according to claim 9, wherein the program further includes instructions for:

performing round-robin scheduling on the respective switch queue corresponding to each switch according to a report message weight that is pre-allocated to each switch.

* * * * *